United States Patent [19]

Ishii et al.

[11] Patent Number: 4,500,426
[45] Date of Patent: Feb. 19, 1985

[54] SEMIPERMEABLE MEMBRANE ELEMENTS

[75] Inventors: Kiyoshi Ishii; Masataka Murai; Hitoshi Yonekawa, all of Saitama, Japan

[73] Assignee: Daicel Chemical Industries, Ltd., Sakai, Japan

[21] Appl. No.: 334,082

[22] Filed: Dec. 24, 1981

Related U.S. Application Data

[63] Continuation of Ser. No. 122,762, Feb. 15, 1980, abandoned.

[30] Foreign Application Priority Data

Feb. 15, 1979 [JP] Japan .................................. 54-17572
Jun. 13, 1979 [JP] Japan .................................. 54-74931

[51] Int. Cl.³ .............................................. B01D 31/00
[52] U.S. Cl. ................................. 210/321.3; 210/346
[58] Field of Search ................... 210/346, 321.2, 321.3

[56] References Cited

U.S. PATENT DOCUMENTS

| | | | |
|---|---|---|---|
| 2,664,395 | 12/1953 | Marchand | 210/321.2 |
| 2,735,812 | 2/1956 | Van Huek | 210/321.2 X |
| 3,401,798 | 9/1968 | Hyrop | 210/346 X |
| 3,695,445 | 10/1972 | Esmund | 210/321.3 |
| 3,799,873 | 3/1974 | Brown | 210/321.3 X |

OTHER PUBLICATIONS

Def. Pub. T867,005, Ulmschneider et al., Published 10-21-1969.

*Primary Examiner*—Frank Spear
*Attorney, Agent, or Firm*—Hubbell, Cohen, Stiefel & Gross

[57] ABSTRACT

A semipermeable membrane element of the type incorporating a flat semipermeable membrane and useful as an artificial kidney. A wave-shaped spacer is provided in intimate contact with the active side of the membrane and forms a multiplicity of parallel channels between the membrane and the spacer for passing a feed liquid therethrough. The parallel channels give a maximum clearance of 35 to 500 microns and 0.6 to 10 mm in width.

8 Claims, 48 Drawing Figures

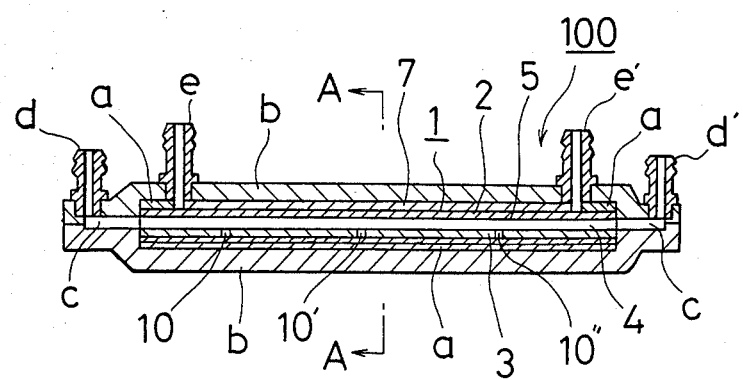
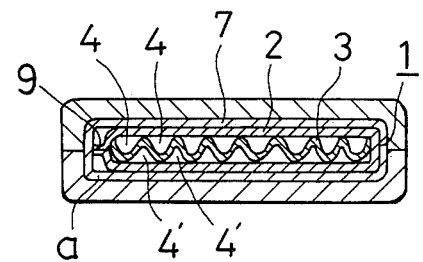
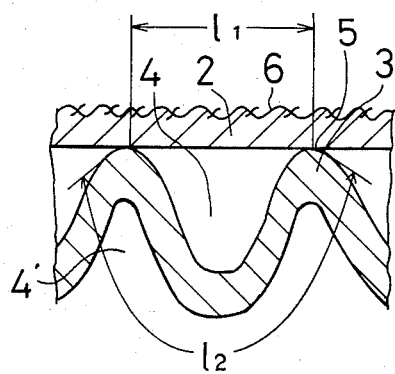
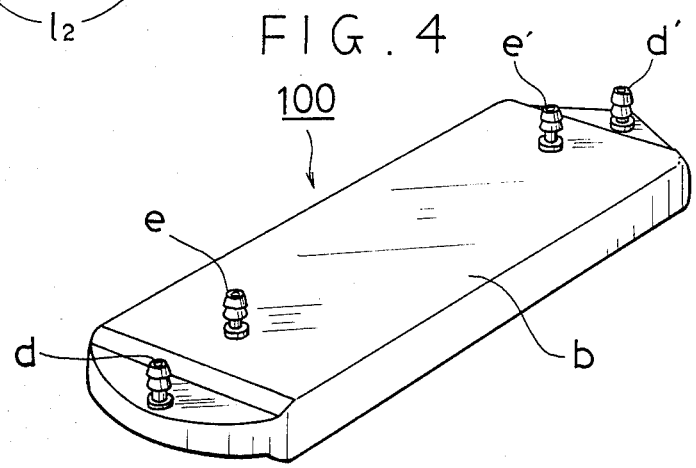

FIG. 4'
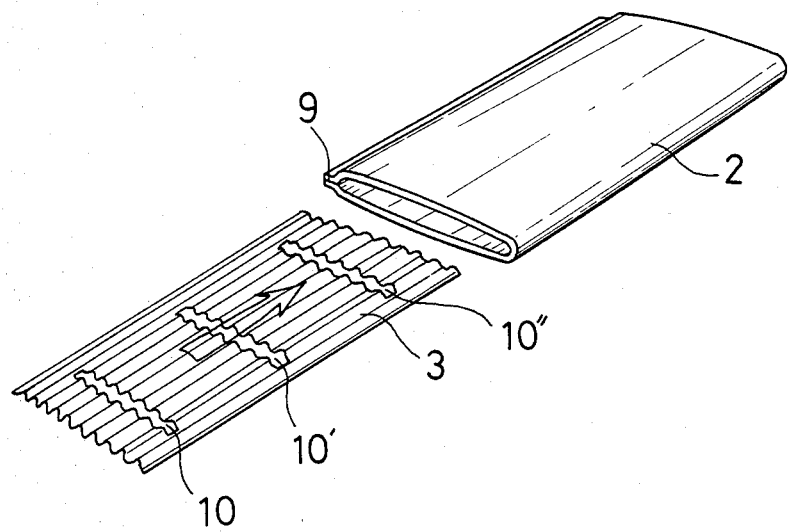
FIG. 4"
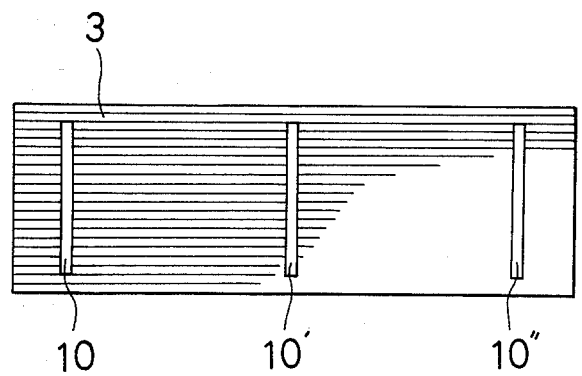

SEMIPERMEABLE MEMBRANE ELEMENTS

This is a continuation of application Ser. No. 122,762, filed Feb. 15, 1980, now abandoned.

BACKGROUND OF THE INVENTION

1. Field of the Invention

This invention relates to semipermeable membrane elements of the type incorporating flat membranes, and more particularly to semipermeable membrane elements of the types, such as pressure-resistant plate type, pleated type, multiple flat tube type, spirally wound type and the like, comprising flat membranes and useful, for example, for hemofiltration or hemodialysis as so-called artificial kidneys.

2. Description of the Prior Art

Precision filtration, ultrafiltration, reverse osmosis and like processes utilizing membranes have found wide use for the separation, purification and concentration of fluids, for the production of water, and for the treatment of industrial effluents. The semipermeable membrane elements known for use in these processes are basically of the tubular type, spirally wound type, hollow fiber type and plate-and-frame type. Additionally those of the pleated type have also been proposed recently. The semipermeable membrane elements comprising flat membranes and heretofore disclosed further include those of the spirally wound type (U.S. Pat. Nos. 3,542,203, 3,554,378 and 3,746,591), the plate-and-frame type (Published Unexamined Japanese Patent Application No. 70280/1975) and the pleated type (U.S. Pat. No. 3,266,223).

With membrane elements including flat membranes and adapted for the purification of the blood, it has been considered undesirable to incorporate a spacer or like member into the channel for the blood to be treated, because when filtering the blood with an artificial kidney, for example, such a member is likely to produce a turbulent or sheared flow in the stream of blood, possibly causing hemolysis or blood coagulation.

In the course of research on such phenomena, we have unexpectedly found that a spacer of specific shape is usable without entailing hemolysis or blood coagulation, further permitting the membrane element to achieve a higher efficiency than the conventional elements including flat membranes. Based on this finding, we have accomplished the present invention.

SUMMARY OF THE INVENTION

This invention provides a semipermeable membrane element of the type incorporating a flat membrane, comprising a constituent unit including a spacer in intimate contact with the active side of the membrane to be exposed to the liquid to be treated, the spacer being capable of forming a multiplicity of parallel channels between the membrane and the spacer, the parallel channels being 35 to 500 microns, preferably 50 to 200 microns, more preferably 50 to 100 microns, in maximum clearance and 0.6 to 10 mm in width.

Throughout the specification and the appended claims the term "maximum clearance" means the largest distance (or channel height) between the opposed surfaces of the spacer and the membrane for passing therebetween the liquid to be treated, as measured perpendicular to the planar membrane surface.

An object of this invention is to provide membrane elements including flat membranes which are superior to hollow fiber type membranes in performance per unit area and in productivity; the elements enabling the membranes to function effectively.

Another object of the invention is to provide membrane elements incorporating semiwet membranes and enabling the membranes to function effectively.

One of the important structural features of the invention is the use of a spacer of specified shape in intimate contact with a flat membrane to form a multiplicity of parallel channels of predetermined size between the membrane and the spacer.

Stated more specifically one surface of the spacer is waveshaped and is capable of forming a multiplicity of parallel channels between the surface of the spacer and the opposed active surface of the flat semipermeable membrane to be exposed to the liquid to be treated. The parallel channels give a clearance of 35 to 500 microns therebetween. Preferably the spacer, when corrugated or wave-shaped, is 20 to 200 microns in the thickness of the original film forming the spacer, about 0.6 to about 10 mm in the pitch of the waves (width of the channels) and about 35 to about 500 microns in wave height.

It is also preferable that the spacer should be formed with portions for keeping the parallel channels in communication with one another.

BRIEF DESCRIPTION OF THE DRAWINGS

FIG. 1 is a view in vertical section showing an embodiment of the semipermeable membrane element according to the invention;

FIG. 2 is a view in section taken along the line A—A in FIG. 1;

FIG. 3 is a fragmentary enlarged view of the same;

FIG. 4 is a perspective view of the embodiment;

FIG. 4' is a perspective view showing the relation between a flat semipermeable membrane and a spacer included in the same;

FIG. 4" is a plan view showing the spacer;

DESCRIPTION OF THE PREFERRED EMBODIMENTS

Figure 5:
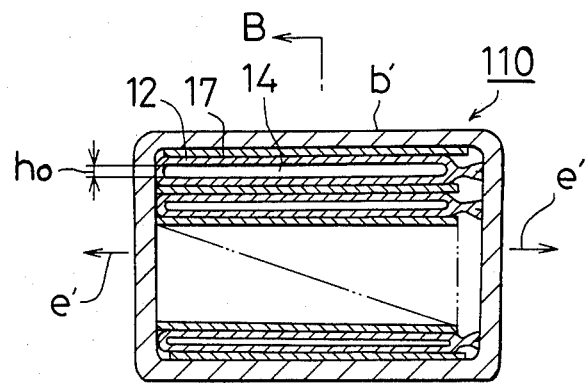
FIG. 5 is a cross sectional view showing a conventional semipermeable membrane element incorporating no spacer.

While various types of semipermeable membrane elements of this invention are usable in accordance with the contemplated purposes, a flat tubular constituent unit, being the basic type, will be described first, followed by the description of modifications thereof, namely, membrane elements of the multiple flat tube type, pleated type, pressure-resistant plate type and spirally wound type. Modifications of various parts of these elements will thereafter be described.

(1) Flat tubular constituent unit

With reference to FIGS. 1 to 4, 4' and 4", indicated at 1 is a semipermeable membrane element constituent unit comprising a flat tubular membrane 2 and a corrugated spacer 3 inserted in the interior of the membrane 2 in intimate contact therewith.

The flat semipermeable membrane 2 of the constituent unit is prepared by forming in approximately 50 to 200 micron thick-wet semipermeable membrane, for example, of cellulose acetate over a woven fabric (serving as backing), for example, of elongated polyethylene terephthalate fibers to obtain a strip having an overall thickness of about 100 to about 400 microns, substituting glycerin for the water of the wet membrane, and joining opposite ends of the strip as by heat sealing as indicated at 9 in FIG. 2 to obtain a flat tube (resembling an envelope) having a feed liquid or blood passage inside thereof. The outer periphery of the constituent unit, which is covered with the backing 6, provides a filtrate passage (outer passage) around the unit. The inner periphery of the constituent unit, which is provided by the flat semipermeable membrane per se, defines the abovementioned feed liquid passage (inner passage) having a spacer 3 therein.

The spacer 3 is corrugated or wavelike and is produced, for example, from "DAIAMID" (trade mark for nylon 12 manufactured by Daicel Chemical Industries Ltd.) by heat pressing. The spacer 3 is about 80 microns in thickness, about 0.9 mm in the pitch of the waves and about 70 microns in wave height. The spacer 3 has small slits 10, 10' and 10" perpendicular to the ridges or furrows thereof. The slits have a width of 2 mm and a length (longitudinal dimension) 4 mm smaller than the width of the spacer and are arranged at the desired spacing. As seen in FIG. 1, the slit 10 is positioned close to the feed liquid inlet d to be described later, namely, to an adhesive layer a at one end of the unit 1, while the slit 10" is located close to an adhesive layer a at the other end of the unit. While the adhesive layers could cause deformation of the parallel channels to be described later, the slits thus arranged serve to eliminate the irregularities in the flow of the feed liquid that would result from the deformation.

The spacer 3 provides on opposite sides thereof a large number of parallel channels 4,4, . . . and 4', 4', . . . between the spacer and the flat semipermeable membrane 2 of the unit. The slits 10, 10' and 10" provide portions for keeping these parallel channels 4, 4, . . . and 4', 4', . . . in communication with one another.

The semipermeable membrane element is enclosed in the body b of a casing with (or without) a filling sheet 7 and is provided with feed liquid inlet and outlet d and d', and filtrate outlets e and e' for use as a module 100. Indicated at c and c are end chambers.

The feed liquid (blood) is supplied to the element through the inlet d, passed through the multiplicity of parallel chambers 4, 4, . . . and 4', 4', . . . and sent out from the outlet d'. At this time, the water and unnecessary solubles in the feed liquid pass through the membrane 2 for filtration and then through the filtrate passage and flow out from the outlets e and e'.

Since the feed liquid passage comprises a large number of uniform parallel channels, hemolysis, blood coagulation and like phenomena can be prevented that would result from the use of a spacer, such as a reticular spacer, that is likely to impede smooth flow of the blood. Although the spacer is designed to have parallel channels of uniform height, it is difficult to assure perfect uniformity owing to the variations involved in the actual manufacturing conditions for the module. However, the slits 10, 10' and 10" formed in the corrugated spacer 3 hold the parallel channels in communication even if the channels are not of uniform section, consequently permitting divided flows of the feed liquid to join and reducing the area where the semipermeable membrane fails to functon properly to ensure an improved overall filtration efficiency.

Other useful materials for the semipermeable membranes are synthetic high-molecular-weight materials such as cellulose acetate butyrate, acrylonitrile copolymer, polyamide, polyimide, polysulfone and like types. Also usable are those to be developed in the future. Materials suitable for filtration or dialysis are selected for use. Useful backings are acetate fabric, and woven or nonwoven fabric of a blend of acetate and polyethylene terephtalate fibers. Also usable is filament netting of such material. The backing is about 50 to about 300 microns in thickness.

Examples of useful materials for the spacer are cellulosic derivatives, such as cellulose acetate, acetate butyrate and acetate propionate, and other synthetic high-molecular-weight materials, such as polyvinyl chloride, polyethylene, polypropylene, polyethylene terephthalate, polysulfone, polyphenylene oxide, polycarbonate, polymethyl methacrylate, polystyrene and fluorine-containing resin. If materials that can be adhered to the semipermeable membrane are selected for use, the spacer can then be joined at its opposite edges to the membrane with greater ease. Thus the membrane and the spacer can be joined together with an adhesive, although heat sealing is preferable to resort to.

The spacer of corrugated or some other suitable form can be prepared preferably by using a heat press or heat roll, or by closely arranging monofilaments in parallel on a plane and joining together the filaments with application of heat or in a vapor of solvent. Further, alternatively, the spacer can be shaped to the desired form by extrusion.

Useful materials for the filling sheet are metal foils as of stainless steel, films of synthetic resins such as those exemplified for the spacer, and woven or nonwoven fabric or netting exemplified for the backing.

The filling sheet can be in the form of a small air cushion made from a synthetic rubber sheet or skin and enclosing an inert gas in its interior. A sponge sheet is also usable. Plastics netting is further usable as another example of elastic material. the desired material should be selected with a full consideration to assure a smooth flow of the feed liquid through the inner passage. For use in artificial kidneys of the dialyzer type, the above-mentioned netting is preferable which should have such a mesh size (e.g. approximately not larger than the thickness of the membrane) that the membrane can be held planar at least on the feed liquid passage side thereof, since the dializing liquid is passed through the outer passage in several times the amount of the feed liquid through the inner passage.

(2) Multiple flat tube type

Figure 6:
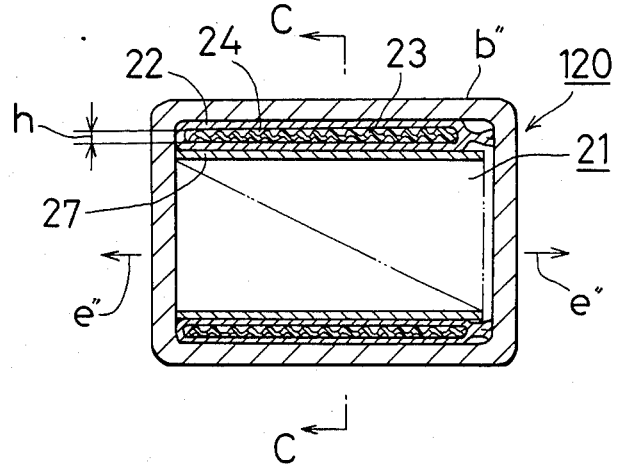
FIG. 6 is a view corresponding to FIG. 5 and showing another embodiment.
Figure 41:
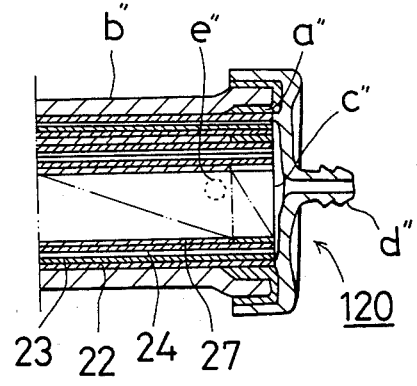
FIG. 41 is a view in section taken along the line C—C in FIG. 6.

FIGS. 6 and 41 show a stack (21) of many flat tubular semipermeable membrane elements. These elements have the same construction as the constituent unit 1 described in section (1) with reference to FIGS. 1 to 4 and 4' with the exception of the spacer. Although the spacers 23, 23, ... of this embodiment are corrugated and exactly same as the spacer 3 described in respect of dimensions, material and other specifications, they have no slits.

The membrane elements are superposed into the stack 21 with a stainless steel foil filling sheet 27 between the adjacent elements, and the stack 21 is housed in the body b" of a casing and fixed thereto with adhesive layers a" to provide a module 120. This module 120 is very useful as an artificial kidney.

Figure 7:
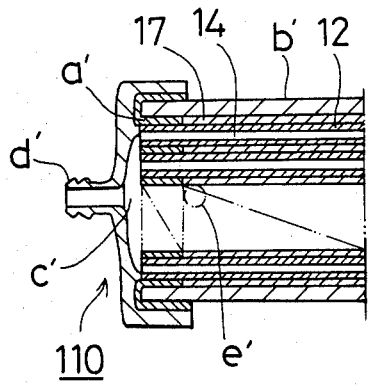
FIG. 7 is a view in section taken along the line B—B in FIG. 5.

FIGS. 5 and 7 show a conventional example of the multiple flat tube type. The flat tubular semipermeable membranes 12 include no spacers therein.

Figure 10:
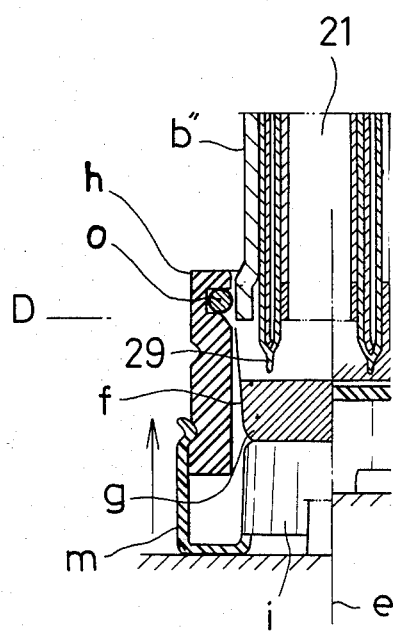
FIG. 10 is a fragmentary view in vertical section of the embodiment of FIG. 6 to show a process for making the same, showing the same before assembly.
Figure 42:
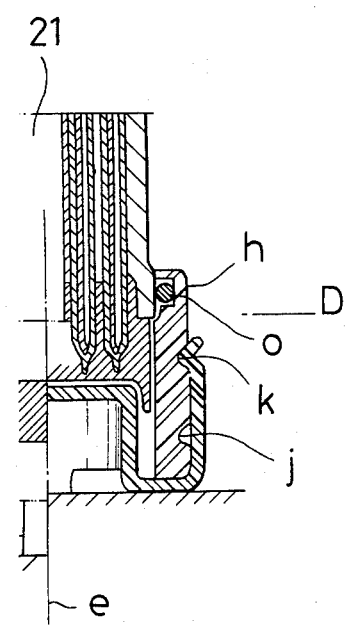
FIG. 42 is a fragmentary view in vertical section of the embodiment of FIG. 6 to show a process for making the same, showing the same after assembly.

FIGS. 10 and 42 shows a specific process for fabricating the module 120. A holder h provided with an O-ring o and having therein a bag f containing a specified quantity of adhesive g is disposed at the lower end of the body b", with a plunger i under the bag. (FIG. 10.)

It is desirable that the holder h, bag f and body b" be transparent. While a pawl m is engaged in notches j of the holder h on the plunger i, the body b" is depressed to engage the pawl m in notches k (FIG. 42).

Alternatively the same result as above can be produced by attaching the adhesive-containing bag f to the lower end of the body b" and squeezing the bag upward from below in FIG. 10. In either case, the adhesive can be applied with application of some pressure.

After the adhesive g has been cured, the stack 21 is cut at a position slightly below the plane D—D in FIGS. 10 and 42, and the cut end is further cut to the plane for finishing. When desired, the finished face is contacted with a hot plate or exposed to flames or a vapor of solvent to eliminate irregularities from the edges of the membranes, especially of the backings. Alternatively the portion to be cut may previously be united by melting.

End chambers c" and nozzles d" and e" are provided for the stack 21 thus treated at each end thereof, whereby a module 120 is obtained which has proper inner passages 24. [FIG. 41].

(3) Pleated type

Figure 8:
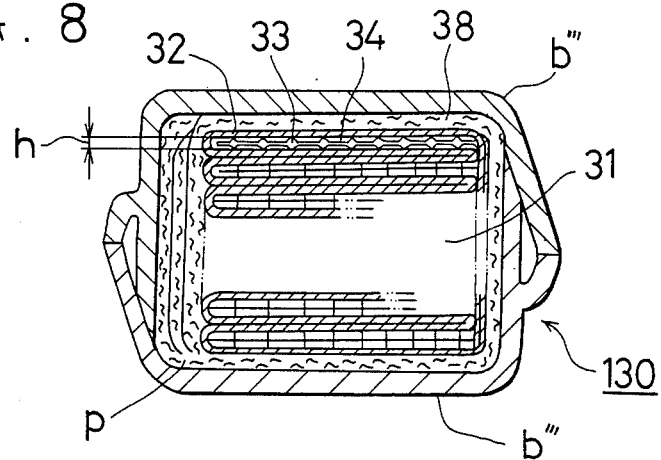
FIG. 8 is a view corresponding to FIG. 6 and showing another embodiment.
Figure 9:
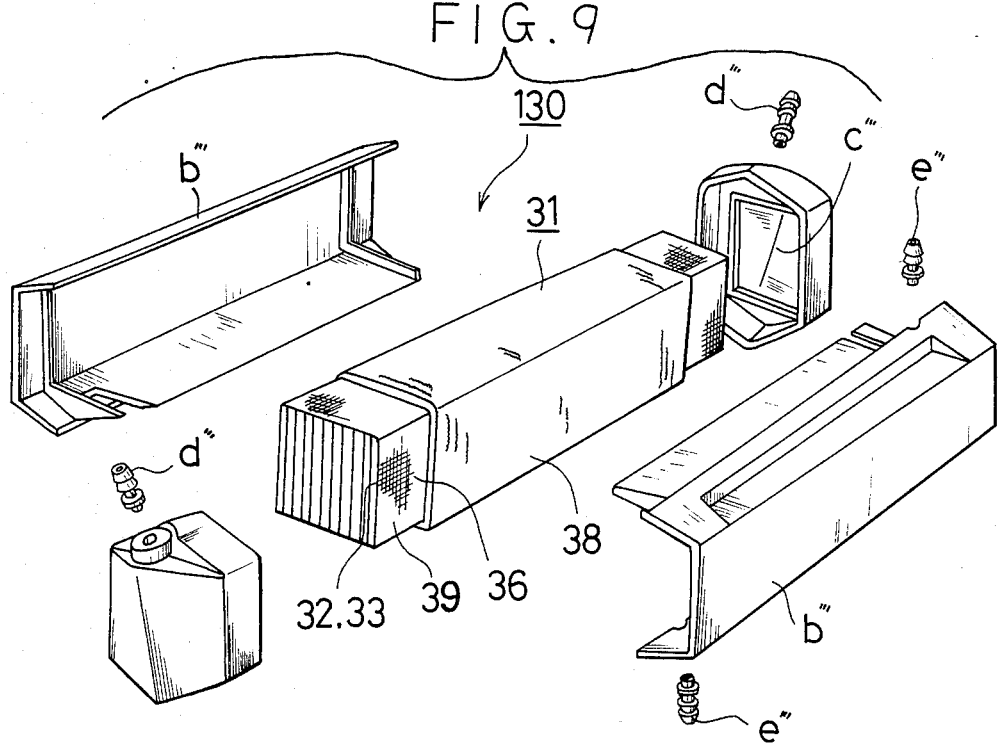
FIG. 9 is an exploded perspective view showing the construction of the same.

With reference to FIG. 8, a pleated flat semipermeable membrane 31 has spacers 33, 33, ... interposed between the folds in intimate contact with one side thereof to be exposed to the feed liquid. The membrane is surrounded by a filtrate passage member 38 and fixedly housed in the body b''' of a casing to provide a module 130. The spacer 33 comprises a flat portion and many angular projections having the same height, integral with the flat portion and arranged symmetrically on the upper and lower surfaces of the flat portion, the projections being arranged in parallel at equal spacing. FIG. 9 shows the module 130 in an exploded view.

(4) Pressure-resistant plate type

Figure 11:
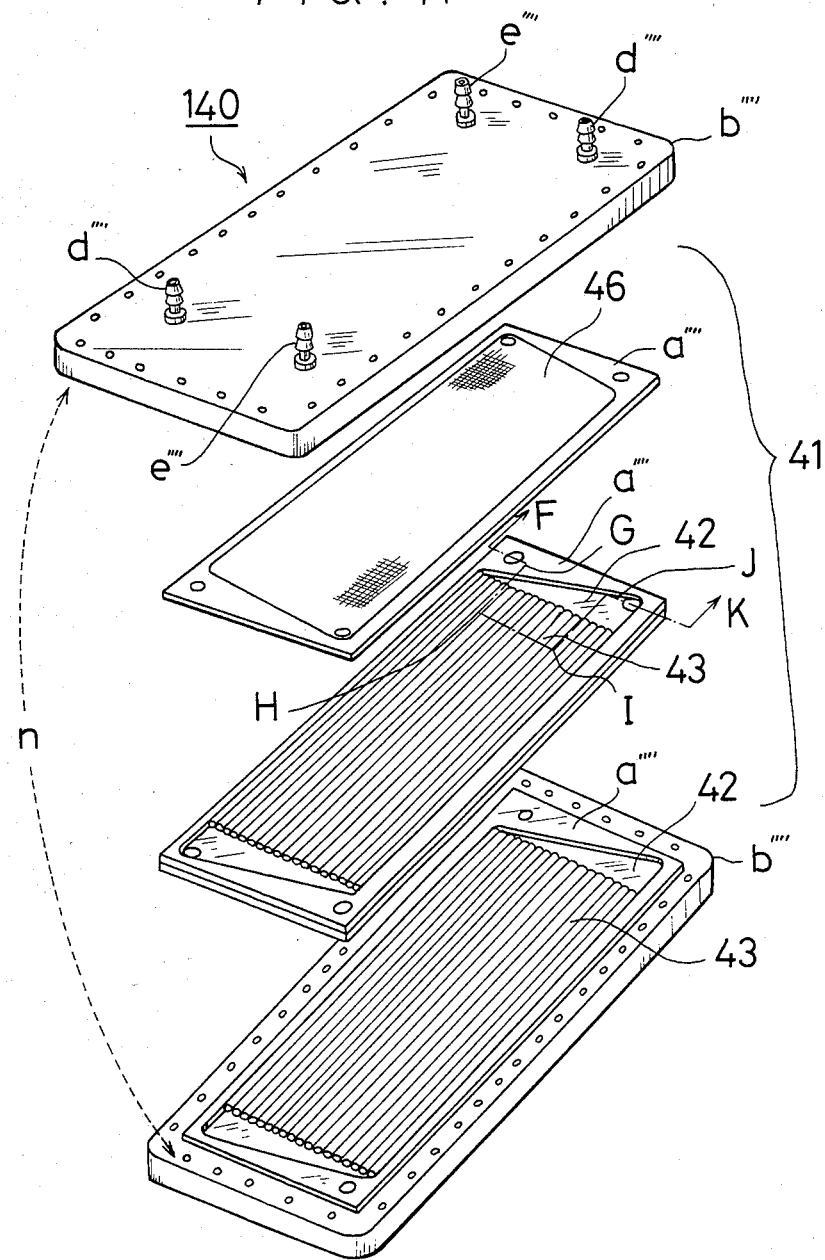
FIG. 11 is an exploded perspective view showing another embodiment.
Figure 12:
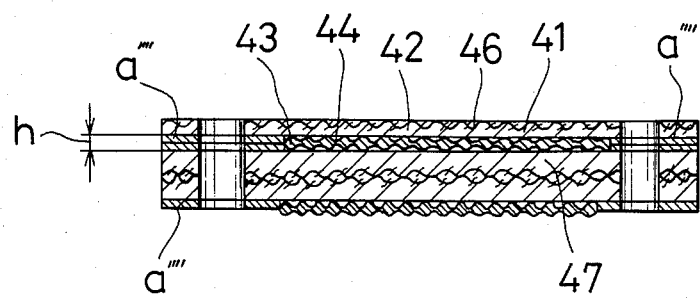
FIG. 12 is a view in cross section showing the same with the parts joined together.

FIGS. 11 and 12 show a semipermeable membrane element of the pressure-resistant plate type, 41, having two semipermeable membranes 42 and 47 with a spacer 43 interposed between the opposed sides thereof to be exposed to the feed liquid. Indicated at a'''', a'''', ... are adhesive layers. The spacer 43 is in the form of a synthetic resin sheet resembling a close parallel arrangement of many monofilaments joined together.

The element 41 of the superposed membranes is sandwiched between bodies b'''' and b'''', which are fastened together by suitable means n.

(5) Spirally wound type

Figure 13:
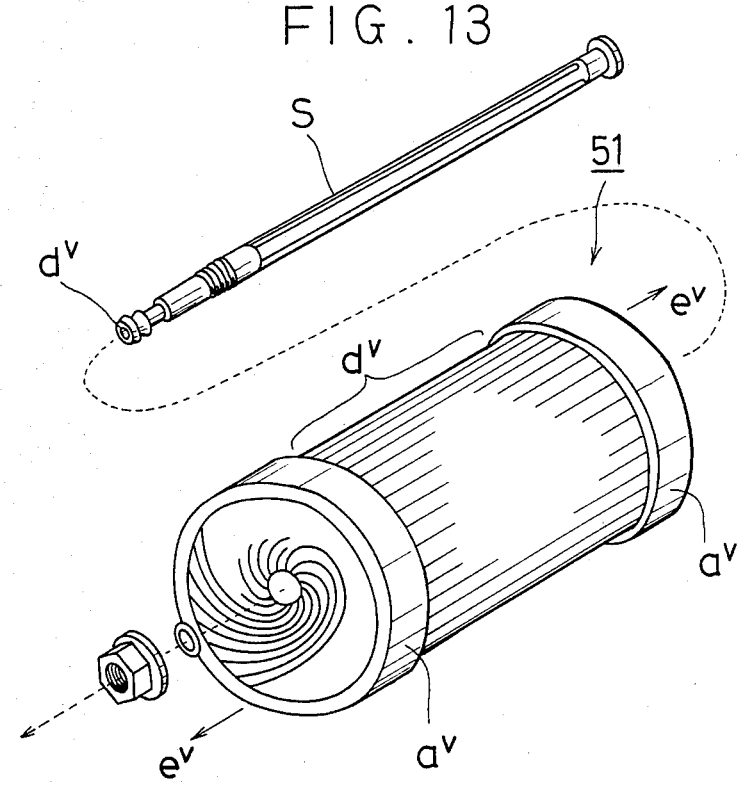
FIG. 13 is an exploded perspective view showing another embodiment.
Figure 14:
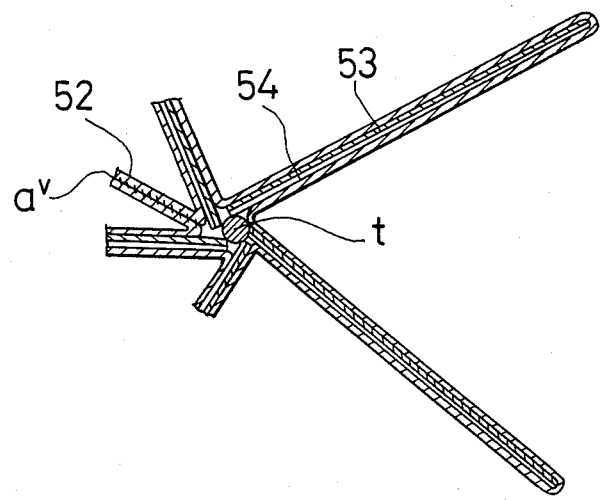
FIG. 14 is a fragmentary enlarged view in cross section showing the same in an initial stage of production.
Figure 15:
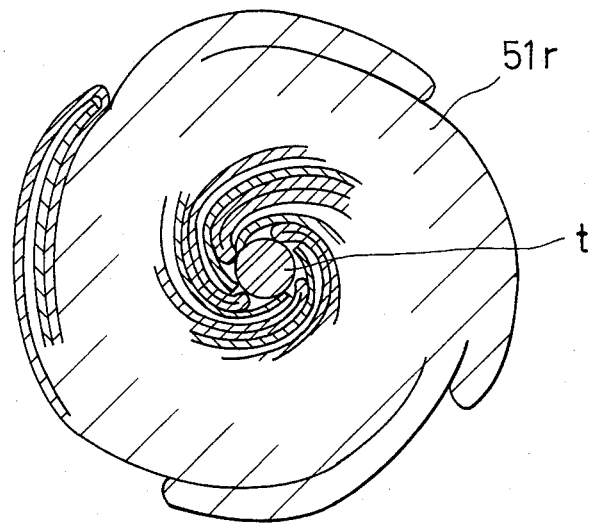
FIG. 15 is a diagram in cross section showing the same in the course of production.

FIGS. 13 to 18 show a semipermeable element 51 of the spirally wound type comprising bladelike constituent units extending from a center rod and wound therearound as shown in FIG. 13 or 15. Each unit comprises a flat semipermeable membrane 52 folded in two and a spacer 53 held between the opposed faces thereof defining a feed liquid passage.

The construction of the element 51 will be described below in greater detail with reference to FIGS. 13 to 17 showing a process for preparing the same. FIG. 14 shows five spacers 53 arranged radially around a mandrel t and folded membrane portions 52 sandwiching the spacers 53 in intimate contact therewith. The opposed selvages of the folded membrane portions 52 at the longitudinal ends of the element 51 are joined together.

Although the spacers 53 are illustrated as being planar for a better understanding, it is of course desirable to use curved spacers approximately in conformity with the shape to which the membrane portions 52 are wound, as will be described below, and to join the selvages of the portions 52 also in the curved form.

Figure 16:
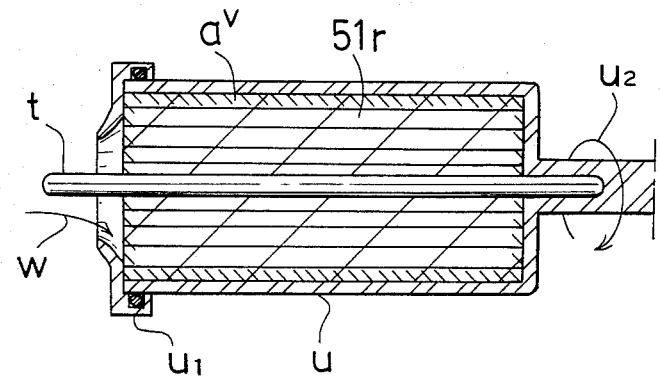
FIGS. 16 and 17 are views in vertical section showing the same.
Figure 17:
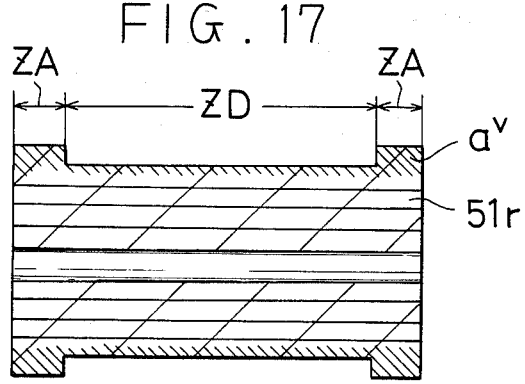

The membrane portions 52 are then wound up as shown in FIG. 15, and are fastened together as with a thread when desired to obtain a winding 51r, which is thereafter placed into a centrifugal case u shown in FIG. 16. A cap $u_1$ is fitted to the case as illustrated.

Subsequently an adhesive, such as a defoamed polyurethane composition, is injected into the case through a nozzle w while rotating the case u in the direction of an arrow $u_2$ at a speed to subject the winding 51r to the desired centrifugal force. The rotation is continued until the adhesive has been cured and become releasable from the case.

The winding 51r is then removed from the case with a cured adhesive layer $a^v$ formed along its outer periphery. The adhesive layer $a^v$ is thereafter cut or ground over a section $Z_D$ shown in FIG. 17 to remove part of the layer and at least the outer peripheral ends of the membrane portions 52, 52, . . . (see FIG. 14) and to thereby open the inner passages 54, 54, . . . of the membrane portions at their outer peripheral ends.

The remaining portions $Z_A$ and $Z_A$ of the adhesive layer $a^v$ partition outer passages from the inner passages 54 at the outer periphery. The outer passages are formed between the outer sides of the membrane portions 54, namely, between the constituent units. The width of the remaining portions $Z_A$ and $Z_A$ is nearly equal to the width of the joined membrane selvages at the longitudinal ends of the element 51.

When the mandrel t is removed from the winding 51r, the inner passages 54, 54, . . . extend from the resulting center bore to the outer periphery of the winding over the section $Z_D$. All the inner passages 54, 54, . . . must be open over the section $Z_D$.

Figure 18:
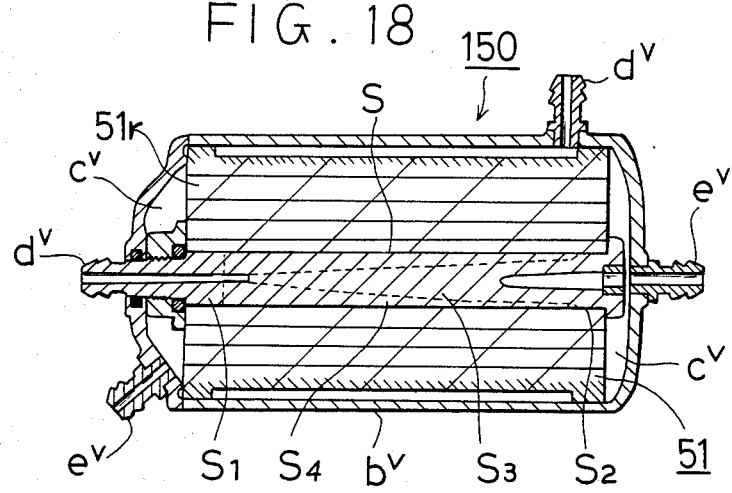
FIG. 18 is a view in vertical section showing the resulting element as assembled into a module.

Subsequently a rod S is inserted into the center bore from the right end of the winding 51r in FIG. 18, and the winding is fastened axially thereof by an O-ring and nuts with use of adhesive.

In this way, the element 51 is assembled into a module 150.

(6) SPACER (i) The spacer is adapted to be held in intimate contact with the semipermeable membrane over the side thereof to be exposed to the feed liquid and is wavelike at least over the contact surface thereof so as to form a multiplicity of parallel channels between the spacer and the membrane. The parallel channels have a maximum clearance of 35 to 500 microns, preferably 50 to 200 microns, more preferably 50 to 100 microns and a width of 0.6 to 10 mm.

Desirable spacers are in the form of corrugated films. While other examples have already been described in sections (1) to (5), other preferred spacers are shown in FIGS. 19 to 24, 40 and 46, as will be described later.

(ii) The multiplicity of parallel channels formed between the spacer and the side of the semipermeable membrane defining a feed liquid passage are adapted to communicate with one another through communicating portions preferably at least at locations close to the feed liquid inlet and outlet. At other locations, such communicating portions are disposed suitably as spaced apart by 10 to 100 mm. The communicating portion need not always be such that the flows through the multiplicity of parallel channels will join together over the combined width of the channels at a time. Preferably, however, the communicating portion extends transversely of the parallel channels at right angles thereto.

To permit such communication, slits, apertures or grooves are formed in the spacer. The slits or apertures enable feed liquid flows on one side of the space to join those on the other side thereof, while the grooves or recesses permit feed liquid flows to joint together only on one side in which they are formed. Depending on the material or shape of the spacer, the spacer will not have sufficient rigidity, in which case the slit should not be formed substantially over the entire width of the spacer. A plurality of relatively short transverse slits will then be formed in one or two rows, or a large number of apertures may be formed similarly in one or two rows.

(iii) Examples of useful spacers will now be described with reference to drawings.

Figure 19:
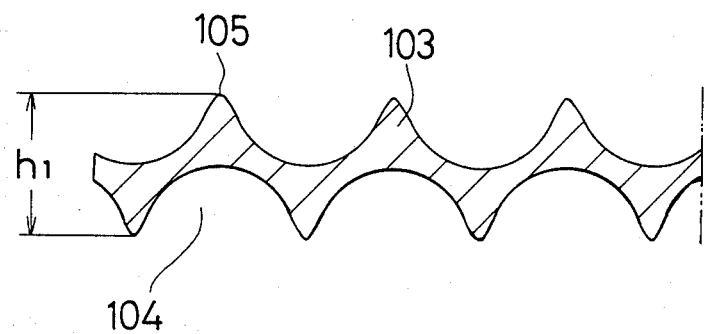
FIGS. 19 to 24 are fragmentary enlarged view in cross section showing other embodiments of the spacer.

The spacer 103 of FIG. 19 comprises a corrugated base having ridges with a vertex angle of 60° and furrows, curved in section, for providing parallel channels 104. When $h_1$ is 300 microns, the parallel channels 104 have a maximum clearance of about 150 microns. Indicated at 105 are the points where the spacer contacts the membrane.

Figure 20:
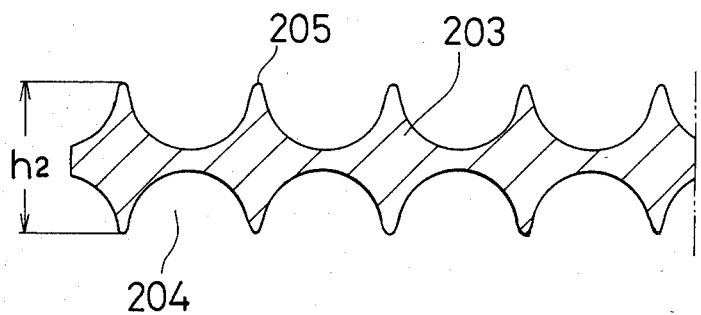

The spacer 203 of FIG. 20 resembles a continuous row of cross signs (+) in cross section. When $h_2$ is 120 microns, the spacer gives a maximum clearance of about 50 microns.

Figure 21:
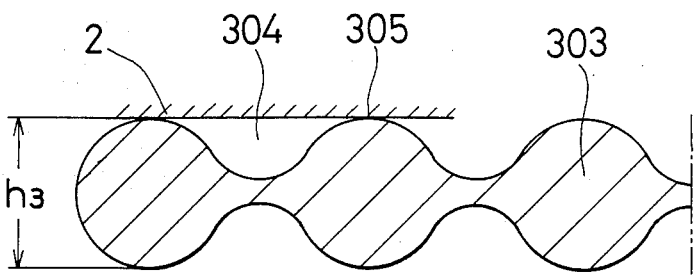

The spacer 303 of FIG. 21 can be prepared by joining monofilaments with heat. When $h_3$ is 100 microns, the spacer gives a maximum clearance of about 40 microns. The drawback is that the channels 304 include narrowed portions near the points of contact, 305, between the spacer and the flat membrane 2.

Figure 22:
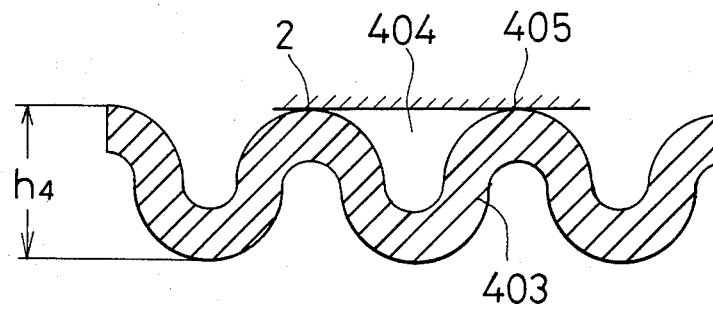

The spacer 403 of FIG. 22 is shaped from a stainless steel foil. When $h_4$ is about 150 microns, the spacer provides a maximum clearance of about 100 microns. The spacer has the same drawback as the spacer 303 near contact points 405.

Figure 23:
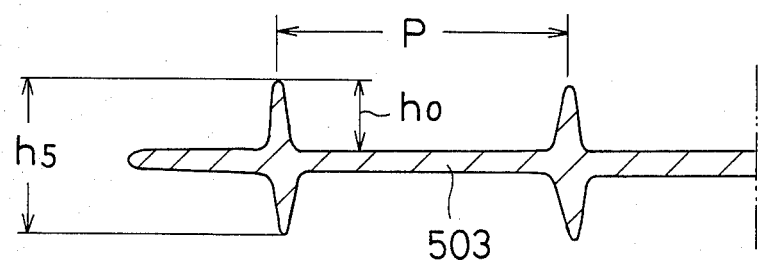

With the spacer 503 of FIG. 23, a kind of modification of the spacer 203 of FIG. 20, good results were obtained in our experiments when $p > 20\, h_o$. The maximum clearance $h_o$ is 50 to 200 microns, preferably about 100 microns.

Figure 24:
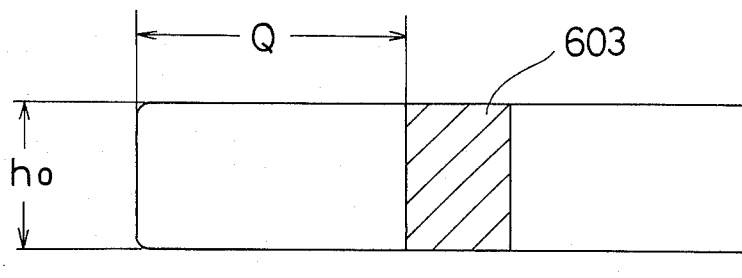

FIG. 24 shows a spacer 603 having no lateral interconnecting portions. The spacing Q between such spacers 603, or between the spacer 603 and the side end of the feed liquid passage (inner passage), should be greater than $20\, h_o$. The maximum clearance $h_o$ is the same as is the case with the spacer 503. The spacer 603 can be adhered to at least one of the opposed membrane surfaces.

Specific examples of communicating portions fomred in spacers will now be described. The spacers shown in FIGS. 27 to 39 and 43-45 are not in shape for use but are in the form before they are incorporated into modules.

Figure 25:
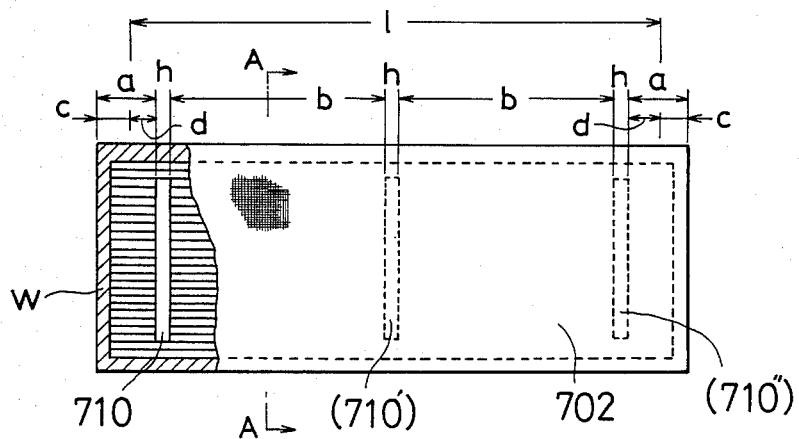
FIG. 25 is a plan view partly broken away and showing a semipermeable membrane element before it is assembled into a module, the membrane element comprising a flat tubular membrane and a spacer inserted therein.
Figure 26:
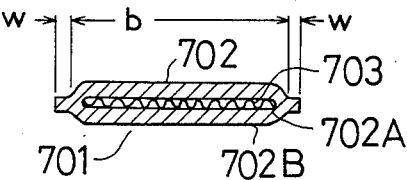
FIG. 26 is a view in section taken along the line A—A in FIG. 25.

First with reference to FIG. 26, there is shown a semipermeable membrane element 701 before it is incorporated into a module. The element 701 comprises a flat tubular semipermeable membrane 702 and a spacer 703. A multiplicity of such elements 701, 701, . . . are placed one above another, and the stack is then placed into a casing having a hollow rectangular to square cross section and capable of confining the stack widthwise thereof. The casing has a length corresponding to the section 1 shown in FIG. 25. The stacked elements are thereafter adhered together as with polyurethane at the sections a, a shown in FIG. 25 to form partition layers. The sections c, c are cut off to form feed liquid inlet and outlet openings as closely arranged side by side. Thus a module can be fabricated.

The spacer 703 is corrugated to provide a large number of parallel channels between the spacer and the membrane 702 and is formed with elongated slits 710, 710' and 710" extending at right angles with the corrugations and serving as communicating portions. The slits are 74 mm in length, 2 mm in width h and 85 mm in spacing b. The spacer is 80 microns in the thickness of its material, 78 mm in width, 214 mm in length, 0.9 mm in the ptich of corrugations, and 70 microns in the height of corrugations (waves).

Figure 27:
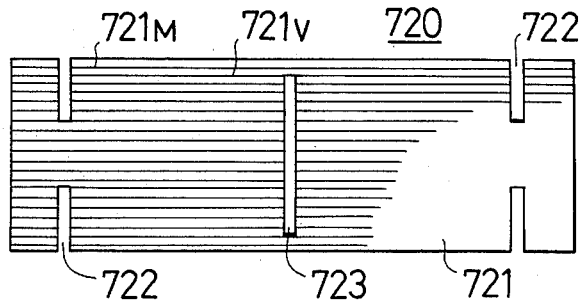
FIGS. 27 to 34 and 37 are plan views showing other embodiments of the spacer.
Figure 28:
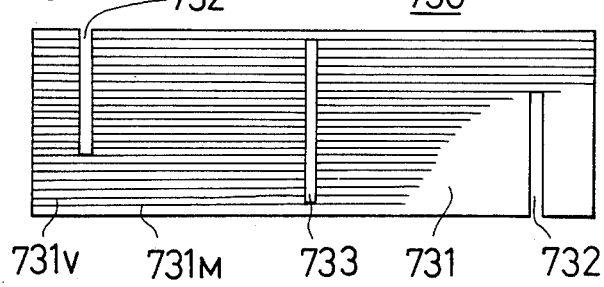

FIGS. 27 and 28 show modified arrangements of slits.

Figure 29:
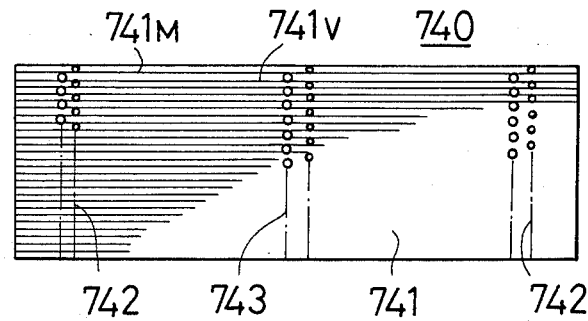
Figure 30:
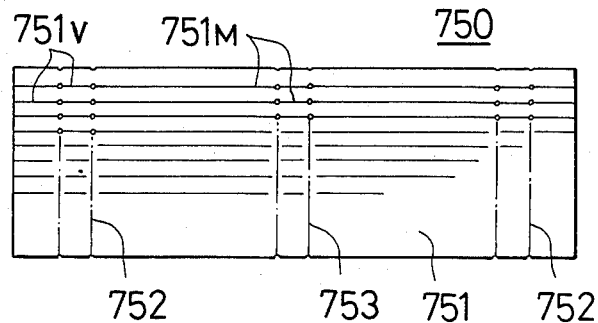

FIGS. 29 and 30 show spacers having many apertures equidistantly spaced apart and servings as communicating portions in place of the above slits. The apertures are about 4 mm in diameter and 7 mm in pitch.

Figure 31:
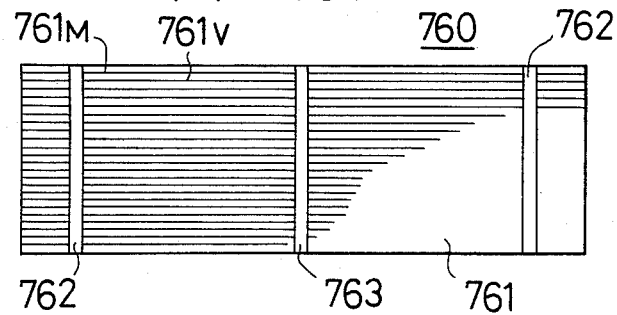
Figure 32:
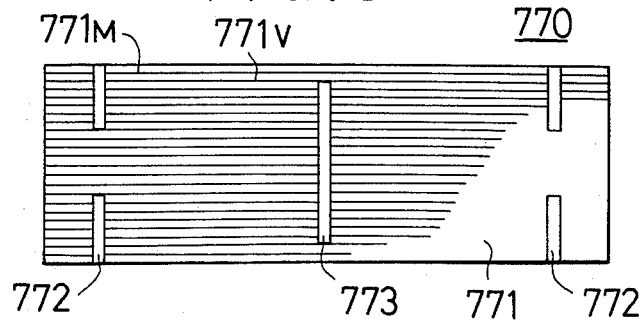
Figure 33:
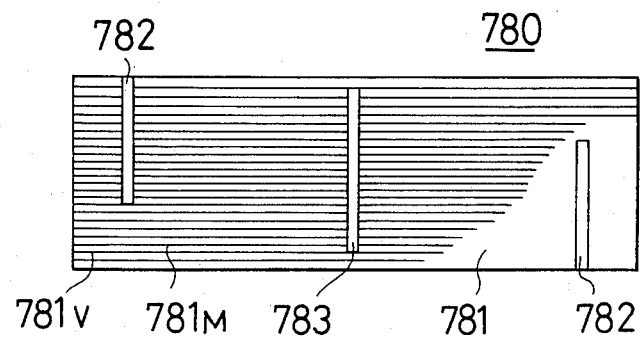
Figure 34:
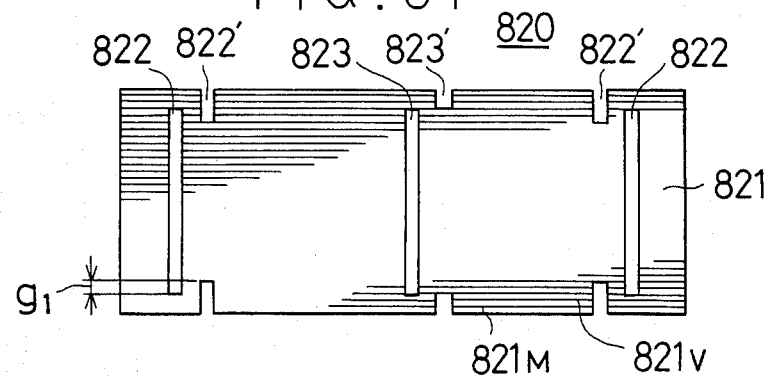
Figure 35:
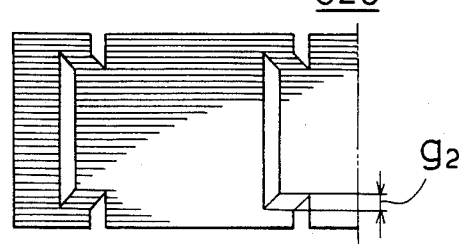
FIGS. 35, 36 and 38 to 40 are fragmentary plan views showing other embodiments of the spacer.
Figure 36:
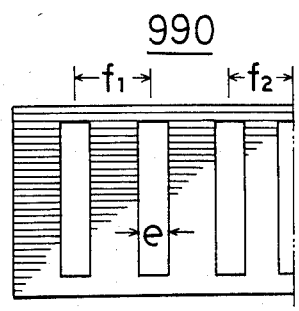
Figure 43:
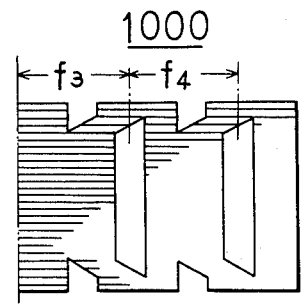
FIGS. 43–46 are fragmentary plan views showing other embodiments of the spacer.

FIGS. 31 to 33 show spacers having flat portions serving as communicating portions in place of slits or apertures and formed by collapsing ridges of the spacers to a mean height with application of heat and pressure followed by cooling.

FIGS. 34 to 39 and 43–45 show spacers having slits or apertures of various shapes in different arrangements.

Figure 40:
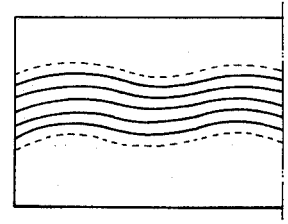

FIG. 40 shows a spacer having a multiplicity of parallel channels which lie in the same zigzag lines.

Figure 46:
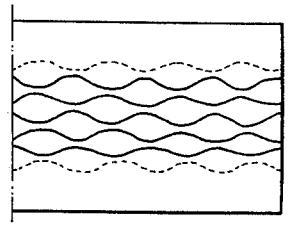

FIG. 46 shows a spacer having a multiplicity of channels which lie in alternate symmetrical zigzag lines.

EXPERIMENTAL EXAMPLE 1

Experiments were conducted with use of the blood of a cow (collected from a slaughtered cow) and living dogs to test the conventional module 110 shown in FIGS. 5 and 7, the module 120 of FIGS. 6 and 41, and another known module of the hollow fiber type, "Torayfiltrizer B-1." Table 1 shows the results.

TABLE 1

| | Module | Effective area of membrane ($m^2$) | UFR** (ml/min.) bovine | UFR** (ml/min.) Dog ex vibo | Test by Hemastic ® *** (Dog ex vibo) | Blood coagulation (Dog ex vibo) | Increase in hemolysis (Dog ex vibo) |
|---|---|---|---|---|---|---|---|
| Experimental Example 1 | Module 120 | 0.45* | 110 | 87 | 0 to + | None | None |
| Comparative Example 1 | Module 110 | 0.64 | 60 | 42 | 0 to + | None | None |
| Comparative Example 2 | Hollow fiber type | 1.15 | 42 | 70 | 0 to + | None | None |

*Calculated on the assumption that 30% of the actual area of the membrane did not function due to the presence of the spacer.
**Ultrafiltration rate.
***Reagent strip for urinary occult blood (positive (+) in the existence of several ppm hemoglobin).

The blood was passed through each module at a rate $Q_B$ of 200 ml/min. The blood pressure at the feed liquid inlet was about 250 mm Hg in Experimental Example 1 and Comparative Example 1, and about 500 mm Hg in Comparative Example 2. The pressure loss Δp in the interior of the module was about 100 to about 150 mm Hg in Experimental Example 1 and Comparative Example 1, and about 50 mm Hg in Comparative Example 2.

The module 120 used for Experimental Example 1 included spacers 23 resembling the spacer 403 of FIG. 22 but having a smaller thickness and sharper corrugations. The spacers 23 were made of polyamide and had a height h of 240 microns and a maximum clearance of about 160 microns. The module used for Comparative Example 1 was 200 micron in dimension ho (see FIG. 5).

Even in the case employing the blood of a dead cow, which was susceptible to deterioration, the increase in hemolysis was hardly observed. The module of the invention achieved remarkably improved UFR values as compared with those of the comparative examples while involving no hemolysis as is the case with the comparative devices.

The UFR value listed is the average of the measurements obtained over a period of about 500 minutes. Especially in the case of Experimental Example 1, the UFR measurements were found to be substantially constant over the test period.

EXPERIMENTAL EXAMPLE 2

Figure 37:
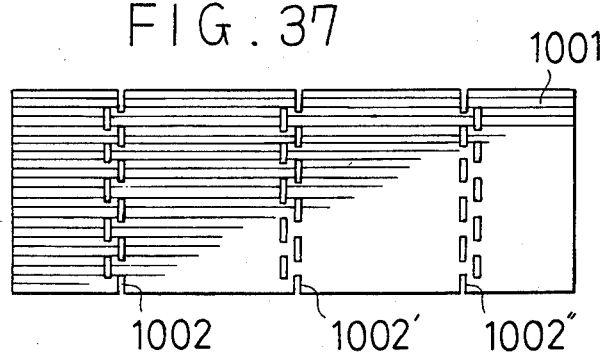
Figure 38:
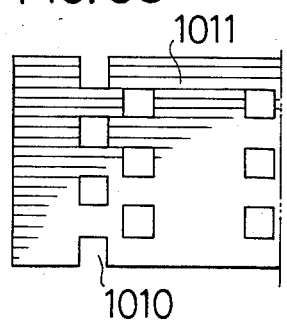
Figure 44:
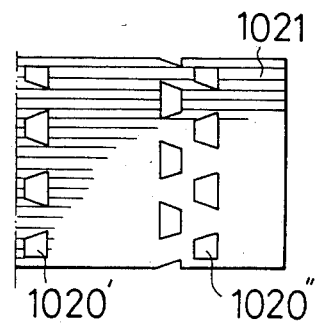
Figure 39:
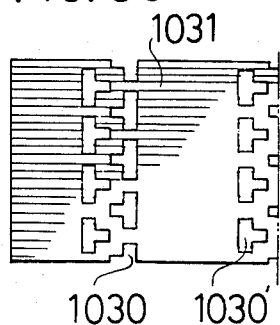
Figure 45:
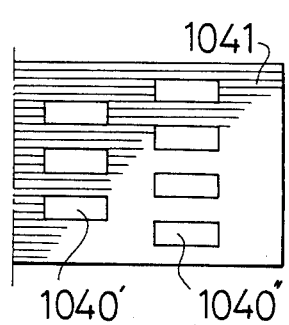

Two modules were tested for comparison, each having one flat tubular semipermeable membrane 44 mm in width and 200 mm in length and a corrugated spacer inserted into the membrane and measuring 2 mm in width and 74 mm in length. The blood channels were 70 microns in maximum clearance. The spacer of one of the modules had three slits; two 1.5 cm away from lateral ends and one in the center. The spacer of the other module had slits or apertures in the same arrangement as shown in FIG. 37.

Cow blood was passed through the modules at a rate of 3.5 ml/min at an inlet pressure of 400 to 500 mm Hg. The filtration rate achieved was 1.7 ml/min for the module with the spacer of the first-mentioned type and 1.8 ml/min for the other module. Thus substantially the same results were achieved. The hematocrit value of the cow blood was adjusted to 25% with a saline solution.

EXPERIMENTAL EXAMPLE 3

Two modules were tested for comparison, each having one flat tubular semipermeable membrane 44 mm in width and 200 mm in length and a corrugated spacer inserted into the membrane and measuring 2 mm in width and 74 mm in length. The blood channels were 70 microns in maximum clearance. The spacer of one of the modules had three slits; two 1.5 cm away from lateral ends and one in the center. The spacer of the other module had slits or apertures in the same arrangement as shown in FIG. 37.

Cow blood was passed through the modules at a rate of 3.5 ml/min. at an inlet pressure of 400 to 500 mm Hg. The filtration rate achieved was 1.8 ml/min. for both the above modules. The hematocrit value of the cow blood was adjusted to 26% with a saline solution.

What is claimed is:

1. A semipermeable membrane element comprising at least one semipermeable membrane having an inlet end and an outlet end, said semipermeable membrane having an active side for being exposed to a feed liquid; a spacer being in contact with said semipermeable membrane and being disposed in a parallel confronting relation to said semipermeable membrane, said spacer being wave-shaped to form between said membrane and said spacer a multiplicity of parallel channels giving a maximum clearance of 35 to 500 microns, said spacer having at least two communicating portions for permitting said parallel channels to communicate with one another, the first communicating portion being disposed near and upstream of the outlet end of the semipermeable membrane and the second communicating portion being disposed near and downstream of the inlet end of said semipermeable membrane, said communicating portions comprising slits extending through the spacer and extending transversely to the spacer and perpendicular to the parallel channels, said slits extending across a major portion of the distance between the edges of the spacer that are parallel to said channels.

2. A semipermeable membrane element according to claim 1, wherein said parallel channels have a width of 0.6 to 10 mm.

3. A semipermeable membrane according to claim 1, wherein said spacer further has a third communicating portion disposed in the center of the spacer.

4. A semipermeable membrane element according to claim 1 which is used for hemofiltration.

5. A semipermeable membrane element according to claim 1 which is used for hemodialysis.

6. A semipermeable membrane element according to claim 1, wherein said semipermeable membrane is in the form of a flat tubular membrane.

7. A semipermeable membrane element according to claim 6, wherein said semipermeable membrane is externally covered with a tacking.

8. A semipermeable membrane element according to claim 1, wherein said spacer is a plastic film having a thickness of 20 to 200 microns and is about 0.6 to about 10 mm in pitch of the waves and about 35 to about 50 microns in the height of the waves.

* * * * *